US006405847B1

(12) United States Patent
Cook et al.

(10) Patent No.: US 6,405,847 B1
(45) Date of Patent: Jun. 18, 2002

(54) DEFLECTOR ASSEMBLY FOR AN ESCALATOR, WALKWAY, OR CONVEYOR

(75) Inventors: Michael Cook, Antioch; Gary J. Sommese; John A. Manno, both of Fairfield, all of CA (US)

(73) Assignee: Advancing Technologies, Antioch, CA (US)

(*) Notice: Subject to any disclaimer, the term of this patent is extended or adjusted under 35 U.S.C. 154(b) by 0 days.

(21) Appl. No.: 09/611,198

(22) Filed: Jul. 6, 2000

(51) Int. Cl.[7] .............................................. B65G 29/00
(52) U.S. Cl. .................................... 198/323; 198/836.1
(58) Field of Search ................................ 198/821, 323, 198/326, 335, 836.1, 837

(56) References Cited

U.S. PATENT DOCUMENTS

| | | | | |
|---|---|---|---|---|
| 5,320,214 A | * 6/1994 | Kordis | ....................... | 198/837 |
| 5,695,040 A | * 12/1997 | Watanabe et al. | ........... | 198/333 |
| 5,810,147 A | 9/1998 | Vanmoor | .................... | 198/323 |
| 6,082,520 A | * 7/2000 | Kleewein et al. | ........... | 198/335 |
| 6,129,197 A | 10/2000 | Gore | .......................... | 198/323 |
| 6,131,719 A | 10/2000 | Gore | .......................... | 198/323 |
| 6,152,279 A | 11/2000 | Davis | ......................... | 198/333 |
| 6,213,278 B1 | 4/2001 | Tanigawa | .................. | 198/333 |

FOREIGN PATENT DOCUMENTS

| | | | |
|---|---|---|---|
| CA | 2208655 | 12/1998 | ............ B66D/1/54 |
| EP | 610579 A1 | * 12/1993 | ........... B66B/29/04 |
| GB | 2 069 438 A | 8/1981 | ............. B66B/9/12 |
| GB | 2 271 135 B | 10/1996 | |
| NL | 1001785 C1 | 1/1996 | ........... B66B/29/04 |

OTHER PUBLICATIONS

Smithsonian Safety Device Test Results, Rail Plant Maintenance, Jul. 26, 1993.

Kleeneze Sealtech Limited, Martins Road, Hanham, Bristol BS15 3DY, UK, Escalator Safetystrip advertisement.

Kleeneze Sealtech Limited, Martins Road, Hanham, Bristol BS15 3DY, UK, Escalator Safetstrip Fitting Instructions.

* cited by examiner

*Primary Examiner*—Christopher P. Ellis
*Assistant Examiner*—Khoi H. Tran
(74) *Attorney, Agent, or Firm*—McCutchen, Doyle, Brown & Enersen, LLP; David G. Beck

(57) ABSTRACT

A flexible guard is provided that can be easily attached to the side skirt of an escalator or other moving walkway or conveyor system, the attachment of the guard occurring either during initial manufacture or during subsequent system modification. The flexible guard minimizes the possibility of side step entrapment without unduly limiting the usable width of the escalator/walkway/conveyor. Additionally, the flexible guard can be mounted close enough to the moving portions of the escalator/walkway/conveyor to minimize the possibility of guard entrapment. The flexible guard includes one or more bristle strips integrated into a flexible base. The base is attached to the escalator/walkway/conveyor using any of a variety of mounting means such as screws, bolts, rivets, etc. One or more light sources can be integrated into the flexible base in order to provide additional illumination of the escalator steps walkway/conveyor.

23 Claims, 3 Drawing Sheets

DEFLECTOR ASSEMBLY FOR AN ESCALATOR, WALKWAY, OR CONVEYOR

FIELD OF THE INVENTION

The present invention relates generally to conveyors and, more particularly, to a deflector assembly attachable to an escalator, walkway, or conveyor to prevent accidental entrapment.

BACKGROUND OF THE INVENTION

A safety hazard associated with escalators and other forms of moving walkways and conveyors is entrapment, specifically the potential for entrapment of the user, clothing articles, or other materials being, transported by the conveying means. Typically the entrapment occurs when an article such as an article of clothing (e.g., shoelace, pants cuff, dress hem, etc.) falls into the gap formed between the moving conveying) means (e.g., stair or sidewalk) and the side skirt. If the article becomes lodged. even temporarily, it may result in serious injury to the user and/or mechanical damage to the conveying means. Children are especially prone to accidents of this type due to the size of their clothing and appendages. Additionally, children are generally likely to be less cautious than adults while traveling on an escalator.

In order to reduce the likelihood of an entrapment accident, escalators and moving sidewalks are fabricated with minimal gaps between the assembly's moving portions (e.g., escalator steps) and the side skirt. In addition, the operators of such assemblies subject them to frequent routine maintenance in order to maintain the gap within a preset range, thus insuring that the gap does not become excessive.

Another technique for minimizing entrapment accidents is to attach a brush guard to the side skirt. If the brush extends sufficiently from the side skirt, it is difficult for clothing or other suitably sized articles to fall within the escalator gap. Unfortunately, the guard may create a new hazard, namely the possibility of a user's shoe or other clothing article becoming lodged between the guard base and the conveying means (e.g., escalator step).

What is needed in the art is an apparatus for minimizing the possibility of side step entrapment in an escalator, moving walkway, or other conveying means without creating a new hazard or limiting the usefulness of the conveying means. The present invention provides such an apparatus.

SUMMARY OF THE INVENTION

The present invention provides a flexible guard that can be easily attached to the side skirt of an escalator, moving walkway, or other conveying means, either during initial manufacture and set-up or during a subsequent system modification. The flexible guard of the present invention minimizes the possibility of side step entrapment without unduly limiting the usable width of the escalator/walkway/conveying means. Additionally, the flexible guard can be mounted close enough to the moving portions of the escalator/walkway/conveying means to minimize the possibility of guard entrapment.

According to the invention, the flexible guard includes one or more strips of bristles integrated into a flexible base. The base is attached to the side skirt of the escalator/walkway/conveyor means using any of a variety of mounting techniques such as screws, bolts, rivets, etc. In at least one embodiment of the invention, one or more light sources are integrated into the flexible base, the light sources illuminating the escalator steps/walkway/conveyor means.

A further understanding of the nature and advantages of the present invention may be realized by reference to the remaining portions of the specification and the drawings.

DESCRIPTION OF THE SPECIFIC EMBODIMENTS

Figure 1:
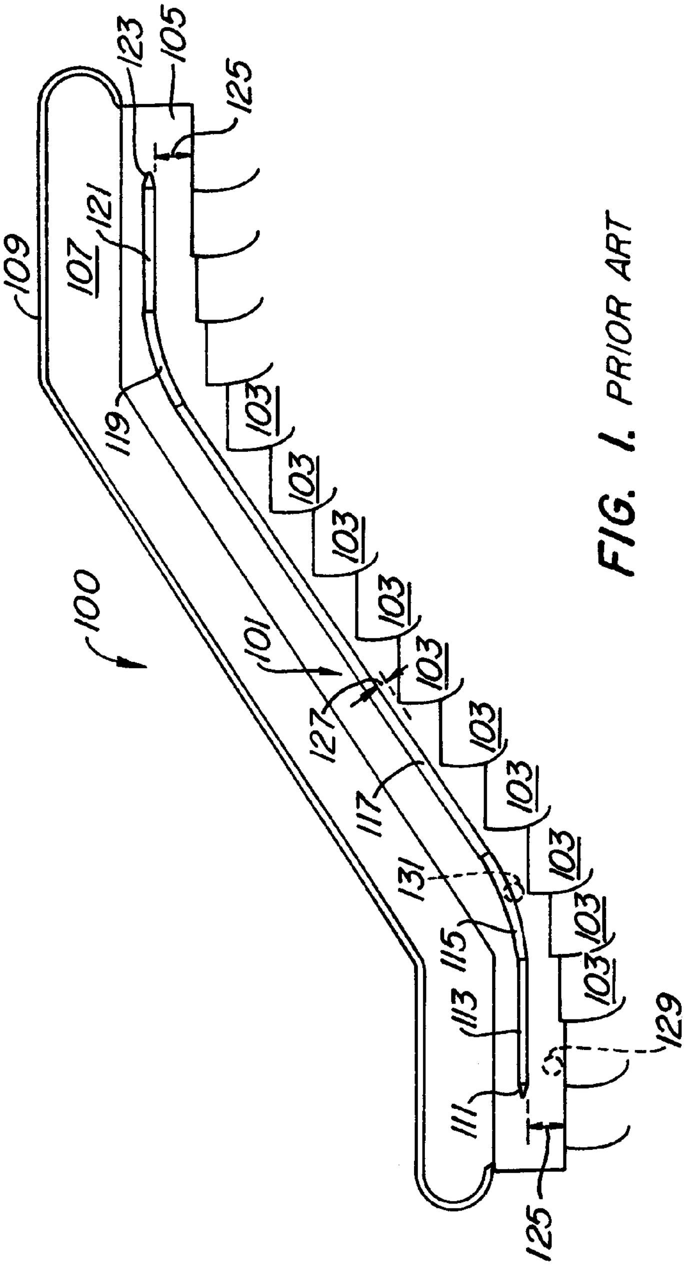
FIG. 1. PRIOR ART
FIG. 1 is a schematic illustration of an escalator with an attached brush assembly according to the prior art.

FIG. 1 is a schematic illustration of an escalator 100 to which a brush assembly 101 fabricated in accordance with the prior art is attached. Escalator 100 includes a plurality of moving steps 103, a side skirt 105, a side wall 107, and a moving hand rail 109. Brush assembly 101 is attached to side skirt 105. According, to the prior art, and as illustrated in FIG. 1, brush assembly 101 is comprised of a first cap 111, a first landing section 113 a first curved section 115, a center section 117, a second curved section 119, a second landing section 121, and a second end cap 123.

Figure 2:
FIG. 2. PRIOR ART
FIG. 2 is a cross-sectional v,iew of the base structure in the brush assembly of the prior art.
Figure 3:
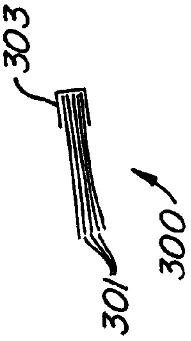
FIG. 3. PRIOR ART
FIG. 3 is a cross-sectional view of the brush strip of the prior art.

FIG. 2 is a cross-sectional view of a base structure 200 used in brush assembly 101. Base structure 200 is formed of extruded aluminum and includes a mounting surface 201, one or more brush strip channels 203, and a plurality of pre-drilled and countersunk mounting bolt holes 205. A cross-sectional view of a brush strip 300 is shown in FIG. 3, brush strip 300 designed to fit within brush strip channels 203. Brush strip 300 includes a plurality of bristles 301 captured within a capture means 303.

In use, the five sectional pieces of brush assembly 101 are fabricated in accordance with the specific dimensions of the escalator to which they are to be eventually attached. Specifically, the landing dimensions, the incline angle, the length of the inclined portion of the escalator, and the style of side skirt 105 are provided to the manufacturer so that the appropriate sectional lengths as well as the appropriate bend radii for curved sections 115 and 119 can be manufactured. Once manufactured, the brush assembly sectional pieces are attached to escalator side skirt 105. After attachment. brush strips 300 are slid within channels 203. Lastly, end caps 111 and 123 are fit to the brush assembly. the end caps insuring that the brush strips remain within channels 203.

Due to the design of the prior art brush assembly, each assembly must be manufactured to match the specific design specifications of the escalator to which it is to be attached. Accordingly. there is a time delay inherent in this approach for manufacturing each custom fit brush assembly. There may also be a cost impact due to the custom nature of the design.

In addition to the manufacturing concerns of the prior art approach, this approach does not allow the brush assembly to conform to the exact design of the escalator. Specifically. due to the use of an extruded aluminum base portion 200 into which brush strips 300 must be slid after attachment to side skirt 105, the possible radii of curved sections 115 and 119 are limited. Additionally, the use of pre-manufactured sections eliminates the ability to substantially alter the configuration of the brush assembly during attachment of the assembly to the escalator side skirt. As a result of these limitations, the spacing 125 between landing sections 113 and 121 and escalator steps 103 is substantially greater than the spacing 127 between the inclined section 117 of brush assembly 101 and escalator steps 103. Typically, a separation distance of 50 millimeters is recommended for spacing 125 while a separation distance of 8 millimeters is recommended for spacing 127.

As a result of the varying separation distance between brush assembly 101 and escalator steps 103, it is possible to trap an article of clothing, a user appendage, or other item between the base portion 200 of the brush assembly and the escalator steps. For example in FIG. 1, assuming a generally upward direction for escalator 100, a user could inadvertently place an article of clothing or a foot at a location 129 between base portion 200 of the brush assembly and the escalator steps. As the escalator steps moves upward, the item initially located at 129 becomes entrapped at a location 131, thus potentially leading to an injury to the user. Therefore even though prior art brush assembly 101 does aid in the prevention of user entrapment between the sides of escalator steps 103 and skirt 105, it creates a new potential entrapment hazard between escalator steps 103 and the brush assembly itself.

Figure 4:
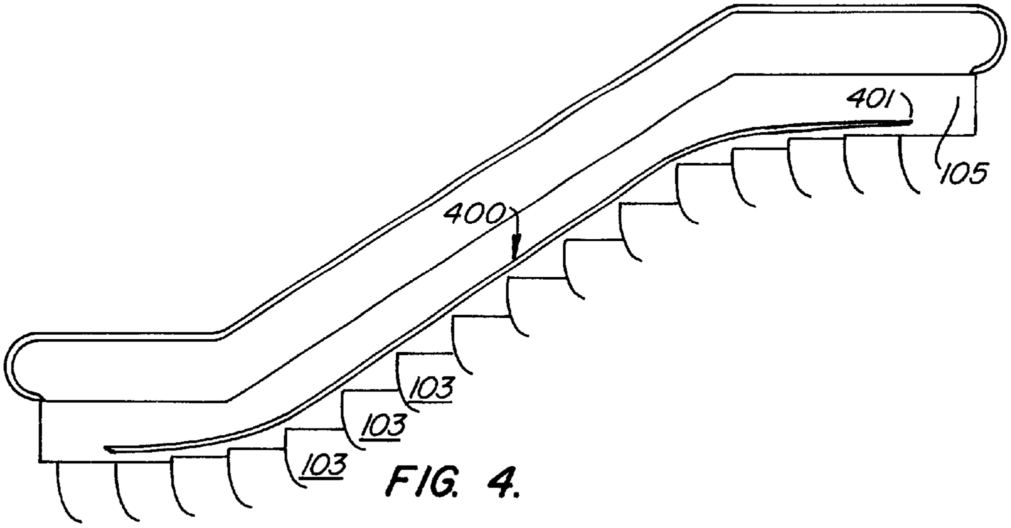
FIG. 4 is a schematic illustration of an escalator with an attached brush assembly in accordance with the present invention.
Figure 5:
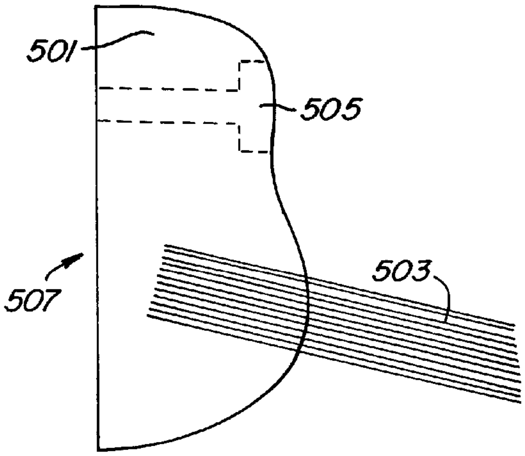
FIG. 5 is a cross-sectional view of one embodiment of a base portion for use with the brush assembly shown in FIG. 4.
Figure 6:
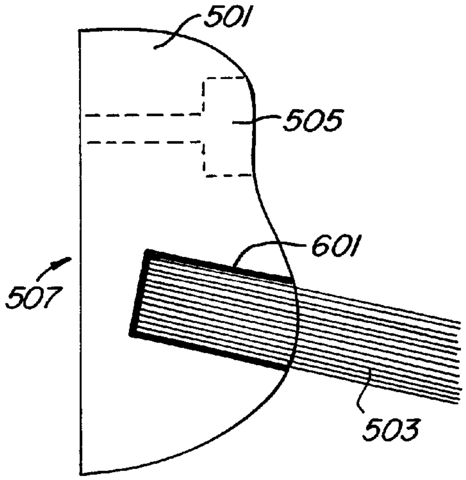
FIG. 6 is a cross-sectional view of another embodiment of a base portion for use with the brush assembly shown in FIG. 4.

FIGS. 4 and 5 illustrate a brush assembly 400 according to the present invention. The base portion 501 of brush assembly 400 is made of a flexible material, i.e., an elastomer, thus allowing brush assembly 400 to be fit to any escalator, regardless of the incline angle, the landing dimensions, or the length of the inclined section. In contrast to the installation of the prior art assembly, the installer of the present brush assembly can simply cut a length of the prefabricated brush assembly and attach it directly to side skirt 105. As a consequence of this design, the steps of measuring the dimensions and angles of the escalator, submitting these dimensions and angles to the brush assembly manufacturer. and waiting for the custom fabrication of a brush assembly are eliminated.

Besides saving the time and money associated with the fabrication of a custom brush assembly as required by the prior art, the present invention allows the installer to maintain a narrow spacing (e.g., typically in the range of 2 to 8 millimeters) between escalator steps 103 and brush assembly 400 along the entire length of the brush assembly as illustrated in FIG. 4. By maintaining constant and minimal spacing, the potential for entrapment is substantially eliminated.

Base portion 501 is fabricated from any suitably flexible material, such as a natural rubber, a synthetic rubber (e.g., silicon rubber, polyurethane, etc.), or a plastic (e.g., thermoplastic, thermosetting plastic, etc.). Bristles 503 are secured to base 501 during the initial fabrication of the base portion, for example by placing the bristles within the mold used to fabricate the base portion. Alternately, base portion 501 can be fabricated first and the bristles can be secured within the base through use of a flexible bonding agent 601 (e.g., a silicon rubber adhesive). Regardless of whether bristles 503 are secured within base portion 501 during the fabrication of the base or in a subsequent fabrication step, completed brush assembly 400 is in the form of a flexible base with one or more integral brush strips which the user or brush installer cuts to the appropriate length, bends to conform to the design of the escalator, and attaches to the escalator's side skirt.

In one embodiment of the invention, base portion 501 includes a plurality of pre-drilled and countersunk holes 505. Bolts, screws, rivets, or other means are used to attach base 501, through holes 505, to side skirt 105. In the preferred embodiment of the invention, base portion 501 does not include any pre-drilled holes. In this embodiment the installer selects appropriate mounting locations and drills, as necessary, holes through the base portion for use with the selected attachment means (e.g., bolts, screws, rivets, etc.).

Figure 7:
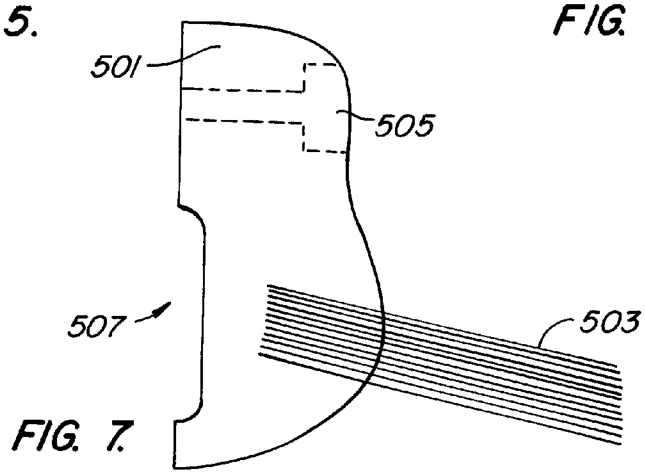
FIG. 7 is a cross-sectional view of another embodiment of a base portion for use with the brush assembly shown in FIG. 4.

As a consequence of the use of a flexible material for the fabrication of base portion 501, a single base design can be attached to a variety of different side skirt and trim configurations. It is understood, however, that mounting surface 507 of base 501 can utilize a variety of shapes. For example, non-planar mounting, surfaces can be used as shown in FIG. 7.

Figure 8:
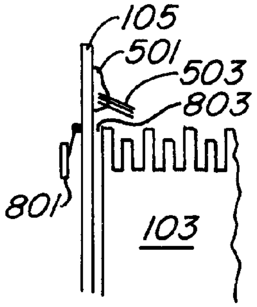
FIG. 8 is a cross-sectional view of a brush assembly attached to an escalator side skirt, the side skirt including a flexure monitor for the detection of side step entrapment.

FIG. 8 is a cross-sectional view of brush assembly 400 attached to side skirt 105. As shown, this embodiment includes a microswitch 801 designed to detect flexure in side skirt 105, side skirt flexure indicating entrapment of something between the edge of escalator step 103 and the side skirt. In contrast to the extruded aluminum base of the prior art brush assembly, the flexible material used for the base material of the present invention allows the side skirt to flex during an entrapment incident, assuming a sufficiently flexible material of suitable thickness is used for base portion 501.

Figure 9:
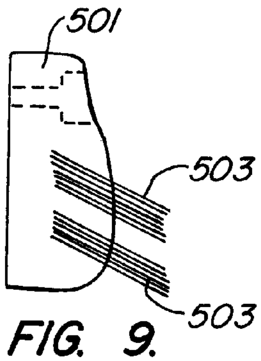
FIG. 9 illustrates an embodiment of the invention utilizing two brush strips.
Figure 10:
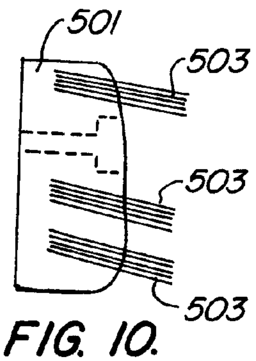
FIG. 10 illustrates an embodiment of the invention utilizing three brush strips.

It is understood that although the embodiments shown in FIGS. 5–8 include a single brush strip, the present invention is equally applicable to brush assemblies utilizing multiple brush strips. For example, FIG. 9 shows an embodiment utilizing two brush strips while the embodiment shown in FIG. 10 utilizes three brush strips. It is also understood that the bristles within the one or more bristle strips can be at virtually any angle relative to the mounting surface of the base portion provided that the bristles extend sufficiently from the base to prevent or substantially prevent accidental side step entrapment. FIGS. 5–10 illustrate the preferred approach wherein the bristle angle is non-orthogonal and wherein the bristles extend in a generally downward direction, thus minimizing the distance separating the bristles from the moving surface (e.g., the escalator steps).

Figure 11:
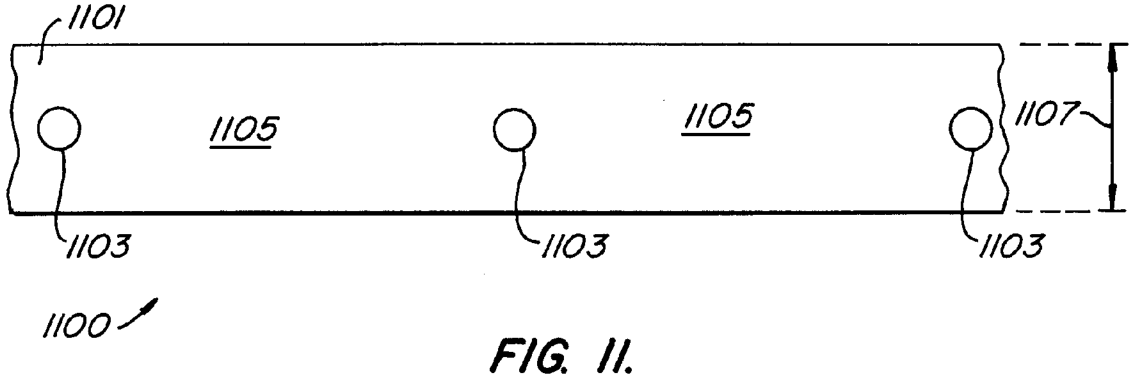
FIG. 11 is a schematic illustration of an alternate brush assembly specifically designed for escalators having minimal skill depth onto which to attach the brush assembly.

FIG. 11 is a schematic illustration of an alternate brush assembly 1100. This assembly is specifically designed for escalators having minimal skirt depth onto which to attach the brush assembly. As shown, a flexible base portion 1101 of assembly 1100 includes a plurality of attachment sites 1103, either pre-drilled or not, interposed between a plurality of brush strip sections 1105. Through the interposition of attachment sites 1103 and brush sections 1105, the width 1107 of assembly 1100 is kept to a minimum.

In at least one embodiment of the invention, a cap section 401 is included on either end of brush assembly 400. Although not required by the design of the brush assembly, cap section 401 can be used to provide an aesthetically pleasing brush assembly end.

Figure 12:
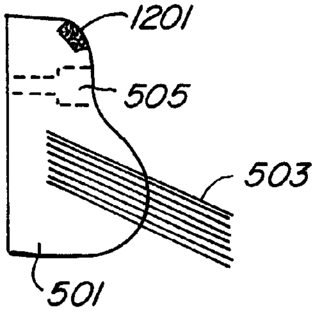
FIG. 12 is a cross-sectional view of a brush assembly with an integrated light.

In at least one embodiment of the invention, one or more lights are included within the brush assembly, the lights providing, additional illumination of the escalator steps or other conveying means and the brush assembly. As shown in the cross-sectional view of FIG. 12, light 1201 is integrated into preferably located above the brush. Lights 1201 are selected from any light producing means, including but not limited to LEDs, LCDs, incandescent lights, and fluorescent lights. Lights 1201 can either be of the form of a plurality of individual lights or one or more continuous light strips. It is understood that although lights 1201 are shown with flexible base portion 501, they may also be used with a non-flexible base portion such as extruded aluminum base structure 200.

As will be understood by those familiar with the art, the present invention may be embodied in other specific forms without departing from the spirit or essential characteristics thereof. For example, although,h the brush assembly has been described primarily with respect to an inclined escalator, it is also applicable to non-inclined escalators or walkways. Similarly, the brush assembly of the present invention can be used in a variety of industrial applications such as with material transport conveyors. Accordingly, the disclosures and descriptions herein are intended to be illustrative. but not limiting, of the scope of the invention which is set forth in the following claims.

What is claimed is:

1. A deflector assembly for use with a conveying means, said deflector assembly comprising:

a flexible base, said flexible base providing a mounting surface for attaching said flexible base to a portion of said conveying means; and a plurality of bristles permanently integrated into said flexible base.

2. The deflector assembly of claim 1, wherein said flexible base is comprised of an elastomer.

3. The deflector assembly of claim 2, wherein said elastomer is selected from the group of elastomers consisting of natural rubber, synthetic rubber, and plastic.

4. The deflector assembly of claim 3, wherein said synthetic rubber is selected from the group of synthetic rubbers consisting of silicon rubber and polyurethane.

5. The deflector assembly of claim 1, wherein said flexible base is comprised of a plastic.

6. The deflector assembly of claim 5, wherein said plastic is selected from the group of plastics consisting of thermoplastic and thermosetting plastic.

7. The deflector assembly of claim 1, wherein said deflector assembly is attached to said conveying means using a plurality of fastening means, said fastening means selected from the group of fastening means consisting of bolts, screws, and rivets.

8. The deflector assembly of claim 1, said flexible base further comprising a plurality of pre-drilled mounting holes.

9. The deflector assembly of claim 1, wherein said plurality of bristles are permanently integrated into said flexible base during the manufacture of said flexible base.

10. The deflector assembly of claim 1, further comprising a flexible bonding agent, wherein said flexible bonding agent permanently bonds said plurality of bristles into said flexible base.

11. The deflector assembly of claim 1, wherein said plurality of bristles is configured within said flexible base as a bristle strip, said bristle strip having a strip width.

12. The deflector assembly of claim 11, wherein said strip width is defined by more than a single row of bristles.

13. The deflector assembly of claim 1, wherein said plurality of bristles is configured within said flexible base as at least two separate bristle strips, each of said separate bristle strips having a strip width.

14. The deflector assembly of claim 13, wherein said strip width is defined by more than a single row of bristles.

15. The deflector assembly of claim 1, wherein said plurality of bristles are permanently integrated into said flexible base at an orthogonal angle to said mounting surface.

16. The deflector assembly of claim 1, further comprising at least one light integrated into said flexible base.

17. The deflector assembly of claim 16, wherein said at least one light is selected from the group of lights consisting of LEDs, LCDs, incandescent lights, and fluorescent lights.

18. The deflector assembly of claim 16, wherein said at least one light is comprised of a plurality of individual lights.

19. The deflector assembly of claim 1, wherein said plurality of bristles is configured within said flexible base as a plurality of separate bristle strips said flexible base further comprising a plurality of base mounting sites interposed between said plurality of separate bristle strips.

20. The deflector assembly of claim 1, wherein said conveying means is an escalator.

21. The deflector assembly of claim 1, wherein said conveying means is a moving walkway.

22. The deflector assembly of claim 1, wherein said conveying means is a material transport conveyor.

23. A deflector assembly for use with a conveying means, said deflector assembly comprising:

a base, said base providing a mounting surface for attaching, said deflector assembly to a portion of said conveying means:

a plurality of bristles integrated into said base; and at least one light integrated into said base.

* * * * *